US009971608B1

(12) United States Patent
Venkatasamy et al.

(10) Patent No.: US 9,971,608 B1
(45) Date of Patent: May 15, 2018

(54) QUICK BOOT FROM HALT BY HALL SENSOR SMART COVER

(71) Applicant: Amazon Technologies, Inc., Seattle, WA (US)

(72) Inventors: Vidhyananth Ramasamy Venkatasamy, Sunnyvale, CA (US); Thomas Gang Wang, San Jose, CA (US); Kamran Khojasteh, Morgan Hill, CA (US); Michael Scott Southard, Jr., Gilroy, CA (US); Mitchell Theodore Orysh, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 14/718,937

(22) Filed: May 21, 2015

(51) Int. Cl.
*G06F 1/00* (2006.01)
*G06F 9/44* (2018.01)
*G06F 1/32* (2006.01)
*G06F 1/16* (2006.01)

(52) U.S. Cl.
CPC .......... *G06F 9/4418* (2013.01); *G06F 1/1626* (2013.01); *G06F 1/3234* (2013.01); *G06F 1/3287* (2013.01)

(58) Field of Classification Search
CPC .... G06F 9/4418; G06F 1/1626; G06F 1/3234; G06F 1/3287
See application file for complete search history.

(56) References Cited

U.S. PATENT DOCUMENTS

| 2008/0082845 A1* | 4/2008 | Morisawa | G06F 1/3203 713/323 |
| 2012/0131365 A1* | 5/2012 | Tabone | G06F 1/3203 713/320 |
| 2013/0007496 A1* | 1/2013 | Tamura | G06F 1/1677 713/323 |
| 2014/0298062 A1* | 10/2014 | Lee | G01R 33/07 713/323 |
| 2015/0134990 A1* | 5/2015 | Masuda | G06F 1/263 713/323 |
| 2016/0077576 A1* | 3/2016 | Karhu | G06F 1/3246 713/323 |

* cited by examiner

*Primary Examiner* — Xuxing Chen
(74) *Attorney, Agent, or Firm* — Eversheds Sutherland (US) LLP

(57) ABSTRACT

A control circuit configured to conserve battery in a mobile device is described. The control circuit upon receiving an input signal from an input sensor sends a suspend signal to the power management integrated circuit (PMIC), which may turn off power in the rest of device and keep the processor and PMIC powered on, thereby transitioning the mobile device into a suspend mode. After a predetermined period of time, the mobile device saves all processes running on the processor and registry content of the memory in a non-volatile memory on the device and shuts off the PMIC and the processor to transition into a hibernate mode. The input sensor and control circuit which receive power directly from the battery management can turn on the PMIC and the processor upon receiving an awake signal from the input sensor, thereby transitioning the device back to an awake mode.

17 Claims, 8 Drawing Sheets

QUICK BOOT FROM HALT BY HALL SENSOR SMART COVER

BACKGROUND

Mobile electronic devices are becoming more and more popular as the number of functions performed by such devices continues to expand. Devices like the smartphones, tablets, and electronic readers (e-readers) are now intimate parts of daily life, both work and recreational. This popularity has created a desire for increasing device usage time per battery charge so that a device is operational when desired, sometimes after long idle periods.

In an effort to extend the time of use on a single battery charge mobile device battery management systems have been developed. One feature of such management systems is to dim a display of a portable device after a relatively long idle time (typically 1 to 5 minutes). Another feature of such a management system is to reduce power to a hard drive after a period of idle time (typically 10 to 30 minutes). While these and other techniques may lengthen the time a device may remain idle on a single battery charge, there remains the desire for longer use periods off a single charge.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
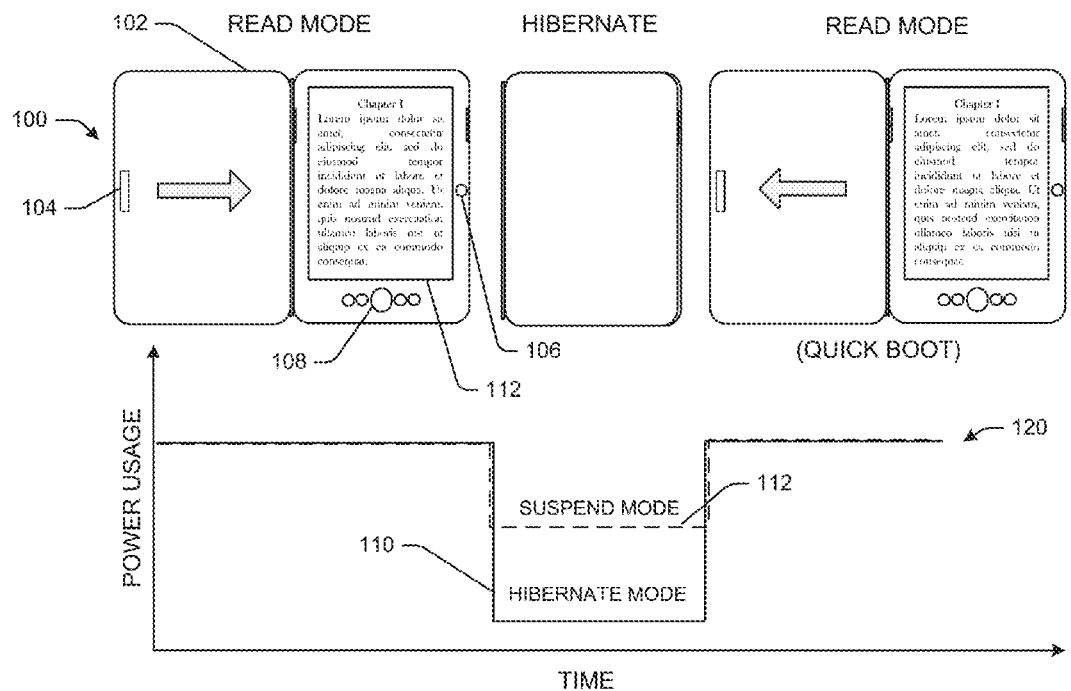
FIG. 1A is a schematic diagram illustrating power usage in different operational modes of a mobile device with a hibernate mode in accordance with one or more example embodiments of the disclosure, as compared to a mobile device without a hibernate mode.

This disclosure relates to, among other things, a hibernate mode in a mobile device that increases the device use time per battery charge by reducing the power usage during idle periods, without materially increasing the time to awaken the device from the hibernate mode (that is, from a prolonged idle state). As an example embodiment, an electronic reader (e-reader) may include a cover to protect the device, which may include a magnetic portion, and a sensor for sensing the opening and closing of the cover, which may be referred to as the cover sensor. In one example embodiment the cover sensor may include a hall sensor that may detect closing of the cover and in response send an interrupt signal to a processor on the device. The processor, upon receiving the interrupt signal, may send a suspend signal to a power management integrated circuit (PMIC) on the device, which may transition the device into a suspend mode upon receiving the suspend signal. In a suspend mode, however, both the PMIC and a processor of the device may be awake and powered on but they may consume lesser power than they would in an awake or read mode of the device. The processor on the device may initiate a timer upon transitioning into the suspend mode, and when the timer ends or a threshold of time has passed the processor may send a hibernate signal to the PMIC based on the premise the device is unlikely to be awakened any time soon if it was not awakened during the period of the timer. The PMIC, upon receiving the hibernate signal, may power down or shut down the processor and the PMIC to conserve battery in a hibernate mode of the device. In the hibernate mode, however, the cover sensor, such as the hall sensor, and a low power boot control circuit or device may still be powered on to detect the opening of the cover and to awaken or boot the device.

In one example embodiment, the e-reader may include a quick boot feature, wherein when the processor determines that the timer has ended in a suspend mode, the processor may store all processes running on the processor and registry content from the memory data register in a non-volatile memory on the device. This way, when opening of the cover generates an awake signal, which is sent to a low power boot control circuit or device, the boot control circuit may send an awake signal to an ON/OFF control switch on the device, which in turn sends the awake signal to the PMIC, which may initiate a quick boot in accordance with example embodiments of the disclosure. For example, in response to the awake signal, the PMIC wakes up and powers on the processor. The processor may then restore all the processes and registry content of the memory data register stored in the non-volatile memory, which was stored at the time the device transitioned into the hibernate mode, and transition the device to the operational state it was in prior to transitioning to the suspend mode with little or no perceived delay to the end user.

One or more example embodiments relate to a mobile device including the hibernate mode described above. The mobile device, according to one or more example embodiments, may include a low power input sensor, such as the cover sensor, and a low power boot control circuit or device, both of which may be powered in a hibernate mode of the device. The PMIC and the processor, however, may be powered down or shut down in this example hibernate mode. The device may also include the quick boot feature, wherein the processor may store all processes running on the processor and registry content from the memory data register in a non-volatile memory on the device before transitioning to the hibernate mode. This way, when the device receives an awake signal from the user or the cover sensor senses opening of the cover, the boot control circuit may send an awake signal to the PMIC, which in turn may power on the processor. The processor at this stage may be able to retrieve all the processes and registry content stored in the non-volatile memory, and instantaneously transition the device to the state it was in prior to transitioning to the suspend mode.

Illustrative Device and Operation

FIG. 1A is a schematic diagram illustrating different operation modes in a mobile device 100 in accordance with one or more example embodiments of the disclosure. Device 100 may be any electronic device such as an electronic reader (e-reader), a smartphone, a tablet, a phablet, or any variation thereof. Device 100 may include a display screen 112, which may be used by a user to read or consume contents being displayed thereon. Device 100 may include one or more control devices 108 which may be used to control the operation of the device 100 or navigate the content being displayed on the display screen 112 or to control the settings of the display screen 112 according to a user's preference. Device 100 may have a cover 102, which may include one or more magnets 104. Device 100 may also include one or more hall sensors 106 which may be used to detect the magnet 104, thereby sensing the closing and opening of the cover 102 for purposes of placing the device in a hibernate mode or awaking the device from the hibernate mode. For illustrative purposes, the device 100 is depicted as an e-reader.

The top portion of FIG. 1A illustrates different modes or states of the device 100, including a hibernate mode according to one or more example embodiments of the present disclosure. FIG. 1A also illustrates the corresponding modes or states in a device 160, which is similar to mobile device 100 but without a hibernate mode. The graph 120 compares power usage between devices 100 and 160 in the various modes. Beginning with an awake or read mode, the covers of both devices 100, 160 are open and the devices are in use. During this mode both devices may use or consume approximately the same amount of battery power, as illustrated in graph 120. However, when the cover of each device 100, 160 is closed, the mobile device 160 may transition to a suspend mode 112 while device 100 may transition to a hibernate mode 110 after a brief period of time in a suspend mode. As illustrated in the graph 120, device 100 in the hibernate mode 110 may consume relatively less power when compared to device 160 in a suspend mode 112. When the cover is opened, devices 100, 160 both may transition back to the awake or read mode. As discussed in detail below, the device 100 may include a quick boot feature that may allow the device to transition from the hibernate mode to an awake mode in a timely fashion that is not disruptive of the user's experience.

Figure 1A:
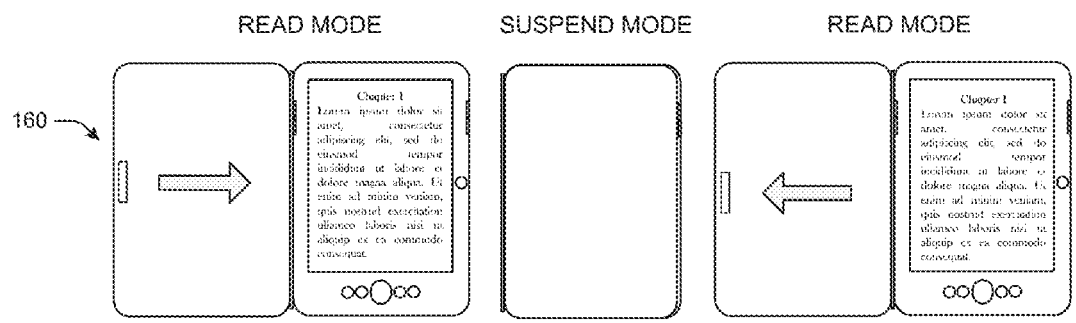
Figure 1B:
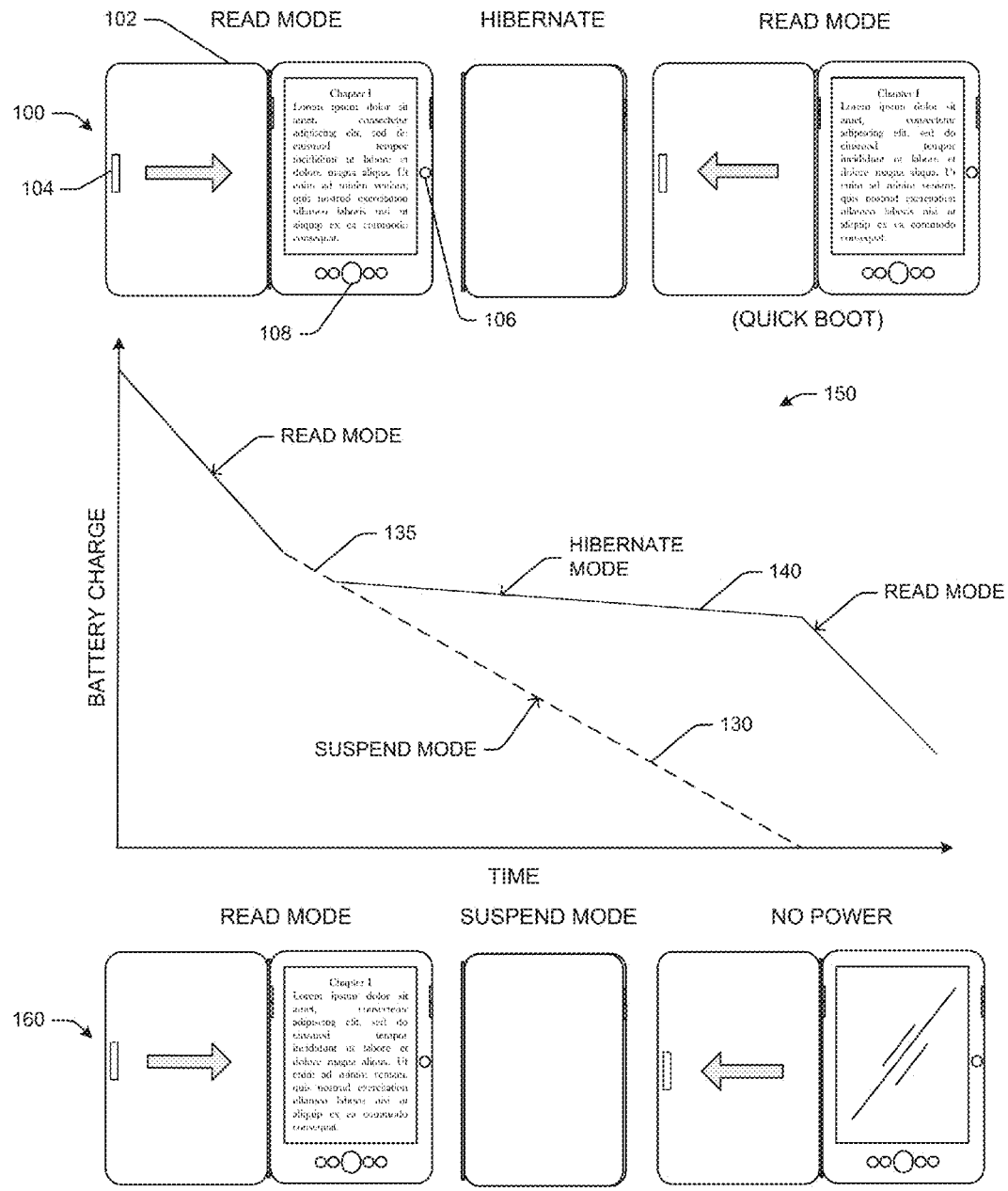
FIG. 1B is a schematic diagram illustrating battery charge in different operational modes of a mobile device with a hibernate mode in accordance with one or more example embodiments of the disclosure, as compared to a mobile device without a hibernate mode.

Turning now to FIG. 1B, graph 150 compares battery charge depletion rates between mobile devices 100 and 160 over a period of time, wherein the device 100 includes a hibernate mode and the device 160 does not. Beginning with an awake or read mode, the covers 102 of both devices 100, 160 are open and the devices are in use or read mode. During this mode both devices may have the same or substantially similar battery discharge rates, as illustrated in graph 150. However, when the covers 102 are closed, the mobile device 160 transitions into a suspend mode and the device 100 initially transitions into a suspend mode for a brief period 135 and then into a hibernate mode. Because device 100 uses relatively less power in the hibernate mode than the device 160 uses in the suspend mode, as illustrated in FIG. 1A, the discharge rate 130 of the device 160 is greater than the discharge rate 140 of the device 100. As illustrated, the device 100 with the hibernate mode may be able to return to an awake or read mode long after the device 160 runs out of power. This is desirable, such as in the case of the device 100 being an e-reader, were a user may not use the device for extended periods of times, even weeks, and rather than finding the device out of power when the user opens the cover the user still has power and can continue using the device from where he or she had left off.

In accordance with an aspect of the disclosure, in the hibernate mode various components of the device 100 may be powered down while maintaining power to the other components. For example, the device 100 may include a power management integrated circuit (PMIC) providing power to a processor, which may both be powered down in a hibernate mode, while a low power boot control circuit or device and a hall sensor in communication with the processor to signal when, for example, the cover is opened or closed, may be powered on in the hibernate mode. In accordance with an embodiment of the disclosure, the device 100 may have a reading or awake mode, a suspend mode, a hibernate mode and a halt mode. In a reading or awake mode, all components of the device may be powered on, and the power consumption may be higher when compared to other modes on the device. In a suspend mode, the PMIC and processor are kept operational (i.e., powered on) and the power consumption during suspend mode may be relatively higher when compared to the hibernate mode or halt mode. In a hibernate mode, however, the PMIC and processor of the device may be powered down and the only components receiving power may be the hall sensor in the device and a low power boot control circuit or device, which may be operatively coupled to each other. The low power boot control circuit or device is preferably a low power component that determines when to transition the device 100 form a hibernate mode to a read or awake mode using inputs from the hall sensor and the processor. In a halt (shutdown) mode, power may be removed from all components of the device 100, including that to the hall sensor and the boot control circuit. To wake up the device 100 from the halt mode, the user may press an ON/OFF button of the device 100, which may trigger a boot signal to the PMIC.

In the mobile device 160, in an illustrative embodiment of an e-reader, without a hibernate mode, the suspend mode may consume about six to seven hundred micro-amps of battery power per hour. In an e-reader configuration, this may result in a suspend mode that may last about one month under a typical use case scenario including, for example, half hour reading and 23.5 hours of suspend mode per day. Users typically do not halt (shutdown) the device to save power because it takes a relatively long time, sometimes more than 30 seconds, to boot from halt to be ready to use the device compared to only a few seconds transitioning from suspend mode to reading mode. In comparison, in a hibernate mode in device 100 the current can be reduced to about fifty micro-amps, for example, more than ten times less than that in the suspend mode. Consequently, the run/idle time can be more than doubled under the same conditions using a hibernate mode in accordance to an embodiment of the disclosure, and user experience can be greatly improved. As an example end result, the user may experience twice as long usage or more per single battery charge.

In addition, a user may expect such a mobile device to wakeup upon opening the cover and expect the device to suspend upon closing the cover. In an example implementation the cover may include a magnet and the device may include a hall sensor to detect the opening and closing of the cover by sensing the magnetic field strength and may send a logic signal or an interrupt signal to the mobile device's processor or the boot control circuit depending on a current state of the device. For example, if the mobile device 100 is in an awake mode, then the signal from the hall sensor may trigger an interrupt signal to the processor to transition the device to a suspend mode, and if the device is in a suspend or hibernate mode, then the signal from the hall sensor may trigger an awake signal to the boot control circuit of the device. While a hall sensor is presented as an illustrative method for triggering a power mode transition, it will be appreciated that other devices and/or techniques may be utilized, such as an accelerometer, an optical sensor, an ambient light sensor, a camera device, a capacitive sensor, an audio sensor, or any sensor with a digital output.

Figure 2:
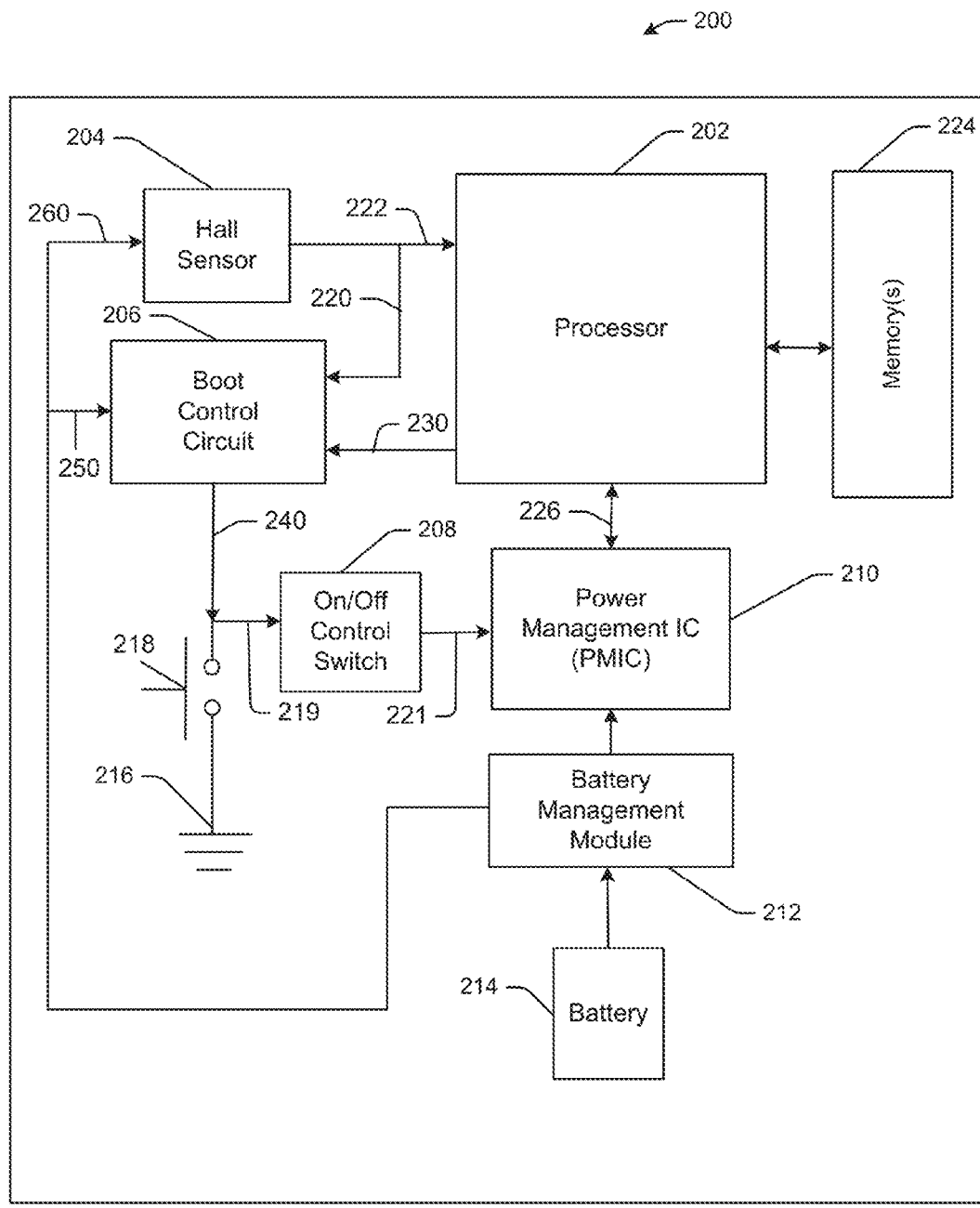
FIG. 2 is a schematic diagram of an illustrative mobile device in accordance with one or more example embodiments of the disclosure.

FIG. 2 illustrates an example system diagram of a mobile device 200 (illustrated as device 100 in FIG. 1), according to one or more example embodiments. The mobile device 200 may include one or more processors 202 that may be powered by a power management integrated circuit (PMIC) 210, which may receive power from a battery management module 212. The battery management module 212 may be connected to a battery 214, which may act as source of power to the device 200. The battery 214 may include any battery suitable for the purpose, including but not limited to Lithium ion batteries, Lithium polymer batteries, and NiCad batteries. The battery management module 212 may provide power to the PMIC as well as the other components on the device. Although battery management module 212 and the PMIC 210 are illustrated as being two separate components in FIG. 2, they may both be part of the same chip. The PMIC 210 may be an integrated circuit for managing power requirements of various components of device 200 and managing power distribution in the device 200. The PMIC 210 may be a solid state device that may control the flow and direction of electrical power within the device 200. The PMIC 210 may provide high efficiency power conversion that may minimize energy loss or heat loss. The PMIC 210 may have one or more functions including but not limited to DC to DC conversion, battery charging, power-source selection, voltage scaling, power sequencing, or other miscellaneous functions. The PMIC 210 may also include battery management, voltage regulation, and charging functions. It may include a DC to DC converter to allow dynamic voltage scaling. PMIC 210 may use pulse-frequency modulation (PFM) or pulse-width modulation (PWM).

The device 200 may include one or more power switches 218 grounded at 216, which may be operatively coupled to an ON/OFF button on the device to receive inputs from a user. The user inputs via the power button 218 may cause the mobile device to transition from one mode to the other, such as transitioning from an awake mode to a suspend mode or from a suspend or hibernate mode to an awake mode by, for example, pressing or otherwise actuating the power button 218. The power button 218 may be operatively coupled with a ON/OFF control switch 208 on the mobile device, which may take the signal on line 219 as input and generate an output on line 221, which may be communicated as a logical signal input to the PMIC 210. Logical inputs may include digital inputs, such as a "1" for an awake signal and a "0" for a suspend signal. For example, when the mobile device 200 is in a reading mode and the user presses the power button 218 on the mobile device, a suspend signal "0" may be sent to the ON/OFF control switch 208, which in turn may pass that suspend signal to the power management IC 210. The processor 202, executing system software, may be able to determine a current state of the device and upon receiving the suspend signal from the PMIC the processor may be able to transition the device into a suspend mode.

The mobile device 200 may also include an input sensor, such as a hall sensor 204, which may be able to detect a magnetic field from a magnet coupled to, for example, the cover of the mobile device. Additionally, or alternatively, the input sensor may be an accelerometer, an optical sensor, an ambient light sensor, a camera device, a capacitive sensor, an audio sensor, or any sensor with a digital output. The one or more processors 202 (also referred to as processor 202) may be in communication with one or more memories 224, which may include one or more volatile memories and one or more non-volatile memories. Memory 224 may store one or more processes which may be executed by the processor 202.

According to one or more example embodiments, battery management module 212 may provide power to the hall sensor 204 and a low power boot control circuit or device 206 via low voltage power rails 260 and 250, respectively. Boot control circuit 206 may be an analog or digital circuit that may be able to receive and process an output from the hall sensor 204. The boot control circuit may be operatively coupled to the hall sensor 204 and the ON/OFF control switch 208 such that the boot control circuit may relay the signal received from the hall sensor 204 at line 220 to the ON/OFF switch controller via line 219. Boot control circuit 206 may also be operatively coupled to the processor 202 such that it may receive one or more general purpose input/output signals from the processor 202 via line 230 while the processor is powered on. The general purpose input/output signals from the processor 202 disables the boot control circuit 206 and prevents the output of an awake signal by the boot control circuit 206 to the ON/OFF switch controller 208 to boot the device 200 when the device is already in an awake or suspend mode, essentially overriding the signal form the hall sensor.

In an awake or active mode of the device 200, the processor 202, PMIC 210, boot control circuit 206, and cover sensor or hall sensor 204 may be powered by the battery management module 212. Upon closing the cover, however, the hall sensor 204 may generate a logical output or interrupt signal to the processor 202 via line 220. The processor 202 may receive this logical input or interrupt signal from the hall sensor and send a suspend signal to the PMIC via line 226 to transition the device into a suspend mode. In a suspend mode, however, one or both of the processor 202 and PMIC 210 may still be powered on but may be operating in a manner that consumes lesser power than they would in an awake or read mode of the device. Upon transitioning to a suspend mode, the processor 202 may initiate a timer, and upon the timer expiring or reaching a threshold, the processor 202 may send a hibernate signal to the PMIC via line 226. The PMIC, upon receiving the hibernate signal, may power down the processor 202 and power down itself to transition the mobile device into hibernate mode to the conserve battery power of the device. In the hibernate mode, however, the hall sensor 204 and the boot control circuit 206 may still be powered on, for example, by the battery management module 212, to receive an awake signal from the user. In the embodiment of FIG. 2, the hall sensor 204 and boot control circuit 206 are low power devices and they consume as little as fifty micro amps per hour in the hibernate mode.

The timer associated with the suspend mode may be set according to user preferences or may be based on prior device usage patterns. For example, a user may select to keep the timer at 0 seconds in the device settings, in which case, the device may transition directly into a hibernate mode without transitioning into a suspend mode. Additionally or alternatively, the timer may be set by the user in the device settings to a predetermined period of time, such as 15 secs or 30 secs, and when that period elapsed following the closing of the device cover the device may transition from the suspend mode to the hibernate mode. It should be noted, however, that if the device 200 cover is opened following the activation of the timer but before the period has elapsed the device may transition to back to the awake mode from the suspend mode. In another example embodiment, the processor may track daily usage information of the device to determine a usage pattern and/or may receive usage or timer setting information or usage pattern information based on other similar devices of the same or different users, and determine a timer setting using the determined usage pattern and/or the received information. For example, a user may close the cover or suspend the device at 10 pm every evening before going to sleep. The processor 202 may track this usage pattern and set the timer so the device transition to hibernate mode within a short period of time, for instance, a few seconds, if not immediately, after the cover is closed at or around 10 pm knowing the user is unlikely to open the device cover again until the next morning. This may enable significant battery saving, and enhance user experience by maintaining the device in a charged mode for longer periods of time. In one example embodiment, the user may preset the time for transitioning the device into the hibernate mode. For example, the user may preset the device to transition to a hibernate mode from 10 pm to 8 am every day knowing the user will not open the device cover until at least 8 am every morning. The processor 202 may receive a user input to transition the mobile device to a hibernate mode at a predetermined time on a real-time clock of the mobile device. In this case, the processor 202 may send the hibernate signal to the PMIC 210 via line 226 to transition the device 200 to the hibernate mode at the predetermined time.

In accordance with an embodiment of the disclosure, the mobile device 200 may include hardware, software, or a combination thereof that provides for a quick boot of the mobile device 200 from the hibernate mode. The quick boot takes the device form the hibernate mode to the awake or read mode in a manner that is relatively quick compared to the booting the device from an complete off mode, thereby providing a better user experience when the user opens begins using the device, for example, when the user opens the cover of the device after an extended period of non-use (e.g., a period sufficient to allow the device to transition into the hibernate mode). In an example embodiment, a quick boot may include the storage in non-volatile memory of the device at least certain processes executing on the processor and registry content at the time the device enters a period of non-use (e.g., a hibernate mode). These processes and register content may then be quickly retrieved by the processor for reinstating operation of said processes for device use in an awake or read mode, such as upon the opening of the device's cover.

In an example embodiment, when the processor 202 determines that the timer has expired in a suspend mode, the processor 202 may store all processes running on the processor 202 and registry content from the memory data register (MDR) in a non-volatile memory 224 on the device. This way, when the device receives an awake signal from the user or the cover sensor senses opening of the cover, the boot control circuit 206 may send an awake signal to the PMIC 210 via the ON/OFF switch controller 208, which in turn may power on the processor 202. The processor 202 at this stage may be able to retrieve all the processes and registry content stored in the non-volatile memory 224, and transition the device 200 to the state it was in prior to transitioning to the suspend mode with little or no delay to the user. The MDR may act as a buffer and hold data that may be copied from the memory (e.g. RAM) so the processor 202 may be able to use it. Data may be loaded into MDR either from a memory bus or from an internal processor bus, and similarly data read from the MDR may be read from either bus.

A logic signal line 230 from the processor 202 to the boot control circuit 206 may be provide an "on" signal from the processor 202 when the mobile device 200 is in an awake or suspend mode or anytime the processor 202 is powered on. This signal disables the boot control circuit 206, and stops it from accidentally sending an awake signal to the PMIC 210. For example, when the boot control circuit 206 is receiving an "on" signal from the processor 202 via line 230 it will not generate a boot signal on line 219 even though the hall sensor is detecting the cover is opened. The boot control circuit 206 may be configured to generate a signal on line 219 only when the processor is powered down and there is no signal on line 230, and the hall sensor output on line 220 indicates the cover is opened, thereby initiating the transition from a hibernate mode to an awake mode by the boot or awake signal generated on line 219 by the boot control circuit 206.

In the hibernate mode, the battery management module 212 continues to provide power to the cover sensor or hall sensor 204 and the boot control circuit 206. When the cover is opened, the hall sensor 204 sends a logical input or interrupt signal to the boot control circuit 206, which initiates a quick boot of the device 200. The boot control circuit 206 receives the input from the hall sensor 204 and sends an awake signal to the ON/OFF switch controller 208. The awake signal is then passed on the PMIC 210 to turn on the power on the device. The PMIC 210, upon receiving this awake signal, turns on power to the processor 202 and all other components that require to be powered on in an awake mode of the device, such as a display of the device. The processor 202 at this point may restore all saved processes and registry content of the MDR from the non-volatile memory 224 and bring the device quickly to an awake or read mode. A difference between the quick boot of the disclosure and a normal boot being the processor in the case of a quick boot is able to retrieve all saved processes and registry content from the non-volatile memory on the device. However, in a normal boot, which may take up to or more than 30 seconds, the processor has to initiate all processes from start, including the kernel applications.

Figure 3:
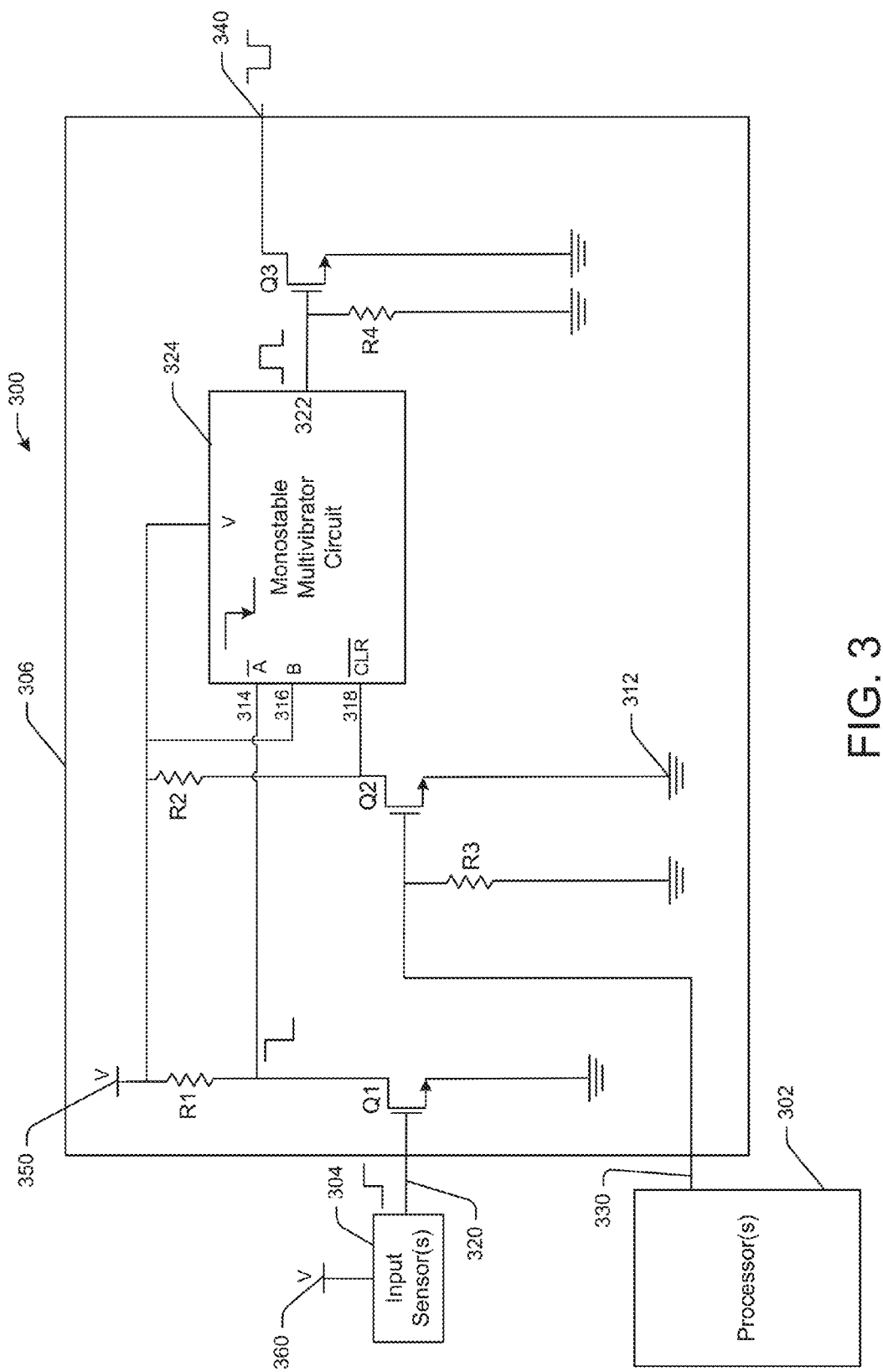
FIG. 3 is a schematic diagram of an illustrative low power boot control circuit in a mobile device in accordance with one or more example embodiments of the disclosure.

While the boot control circuit 206 may be implemented through circuit components, software, firmware or any combination thereof, FIG. 3 provides an illustrative embodiment of a boot control circuit or device 306 in a mobile device 300. As illustrated, the boot control circuit 306 may receive inputs from one or more input sensors 304, such as a hall sensor, via line 320, and one or more general purpose input/output signals (GPIO) from one or more processors 302 via line 330. The boot control circuit 306 and the input sensor 304 may receive power from the battery management module (not shown) via a digital low voltage power rail including a low voltage power supply at terminals 350 and 360, respectively.

The boot control circuit or device 306 may include a monostable multivibrator circuit 324, which may be, for example, any single triggerable monostable multivibrator circuit. Boot control circuit 306 may also include one or more resistors R1, R2, R3, and R4 that may be connected in series or parallel to one or more N-Channel metal-oxide semiconductor field effect transistors (MOSFETs) Q1, Q2, and Q3, as illustrated in FIG. 3. The MOSFET Q1 may be used to amplify or switch signals received from input sensor 304, and resistor R1 may implement electrical resistance as a circuit element in combination with the input signal of MOSFET Q1 to control the operation of the MOSFET Q1. In similar fashion, MOSFET Q2 may be used to amplify or switch signals received from processor 302, and resistor R3 may implement electrical resistance as a circuit element in combination with the input signal of MOSFET Q2 to control the operation of the MOSFET Q2. Similarly, MOSFET Q3 may be used to amplify or switch signals received from the monostable multivibrator circuit 324, and resistor R4 may implement electrical resistance as a circuit element in combination with the input signal of MOSFET Q3 to control the operation of the MOSFET Q3.

In the illustrative embodiment of FIG. 3, the resistors R1 and R2 provide operating bias for Q1 and Q2, and R3 and R4 prevent static charge build-up at the Q2 and Q3 gates. One or more of the resistors R1, R2, R3, and R4 may have a resistance of 1 MΩ or higher depending on the configuration of the boot control circuit. One or more of the MOSFETs Q1, Q2, and Q3 may have a gate to source threshold voltage of 1.2V or more depending on the configuration of the boot control circuit. According to one example embodiment, the monostable multivibrator circuit 324 may be a single triggerable monostable multivibrator chip with one or more Schmitt trigger inputs.

For example, terminal 320 may transmit an interrupt signal from the hall sensor 304 to the input gate of Q1. Hall sensor 304 may have a push output or a pull output, which can be high or low depending on whether the magnet from the cover is detected or not, e.g., the cover is closed or not. The hall sensor 304 may trigger a level change when the cover is opened, at which point the hall sensor 304 output may go from low to high, which may turn on transistor Q1 and invert the signal from high to low, essentially driving the voltage on the drain of Q1 to ground. This high to low transition may be sent to the mono stable multivibrator circuit 324 at input 314. Input 314, which may be a gated active LOW-going edge input (A), may respond to a falling edge, and once it detects a falling edge, it may generate a monostable pulse at terminal 322 of the multivibrator circuit 324. The monostable pulse may momentarily turn on transistor Q3 which may invert the pulse and whose output may be sent to terminal 340. Turning on the transistor Q3 may result in pulling down of the ON/OFF control switch at terminal 340, the end result of which may be similar to an ON/OFF button press or actuation on the device.

Terminal 330 may receive a general purpose input/output (GPIO) signal from the processor 302 during periods when the processor is powered on and operating in a read or awake or suspend mode, and in response mask or disable the multivibrator circuit 324 in such a way that the opening or closing of the cover may not trigger an action, that is, produce an inverted pulse on terminal 340. For example, when terminal 330 is high, indicating the presence of a GPIO signal, such signal may turn on the transistor Q2, and pull down the CLR terminal 318 of the monostable multivibrator circuit 324, essentially driving the terminal 318 to ground 312. The CLR terminal 318 can be a gated active LOW-going edge input similar to 314. For example, when terminal 318 is held low, there may be no monostable output at 322. Accordingly, when the processor of the mobile device is powered on and running, the GPIO input at terminal 330 avoids an inverted pulse on terminal 340, thereby avoiding the triggering of the ON/OFF control switch controller.

Inputs can be driven from either a 3.3 V or a 5 V device, which may allow the use of these devices as translators in a mixed 3.3 V and 5 V environment. Schmitt trigger inputs can also make the monostable multivibrator circuit 324 circuit highly tolerant to slower input rise and fall times. The monostable multivibrator circuit 324 may be specified for partial power-down applications by disabling the output, preventing the damaging backflow current through the device when it is powered down. For example, this feature may also be useful when the device is still powered on and a quick boot signal may not be required.

Illustrative Processes

Figure 4:
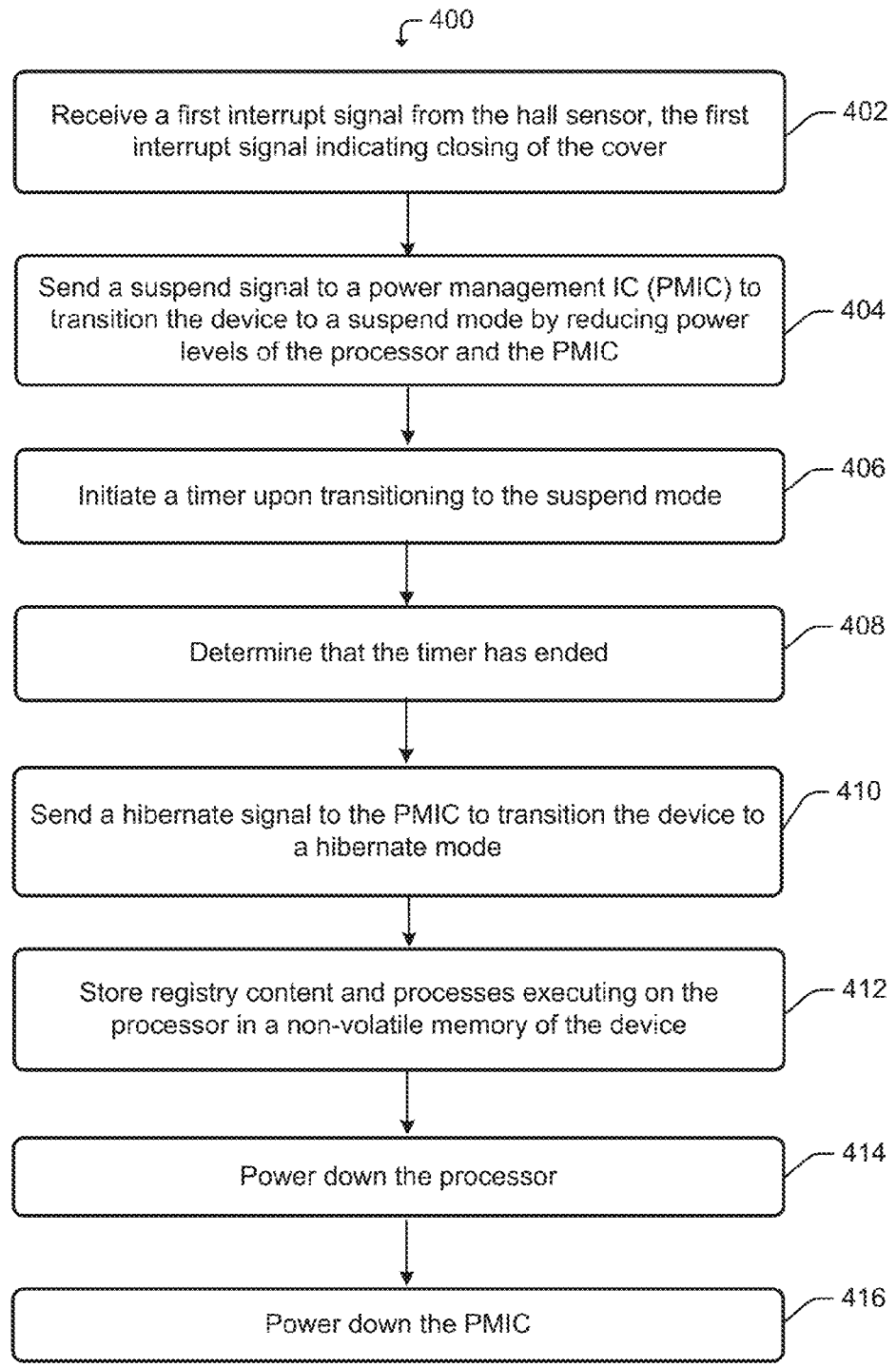
FIG. 4 is a process flow diagram of an illustrative method for transitioning a mobile device into a hibernate mode in accordance with one or more example embodiments of the disclosure.

FIG. 4 is a process flow diagram of an illustrative method for transitioning into a hibernate mode in a mobile device in accordance with one or more example embodiments of the disclosure. Referring to FIG. 4, at block 402, in an awake mode of a mobile device in accordance with an embodiment of the disclosed herein, the device's processor, PMIC, boot control circuit or device, and cover sensor or hall sensor may be powered by the device's battery management module and battery. Upon detection of the closing of the cover of the cover, the hall sensor may generate an interrupt signal, and the processor may receive the interrupt signal from the hall sensor. At block 404, the processor may send a suspend signal to the PMIC to transition the device to a suspend mode by reducing power levels of the processor and the PMIC. At block 406, the processor may initiate a timer upon transitioning to the suspend mode. In a suspend mode, however, the processor and PMIC may still be powered on. At block 408, the processor may determine the timer has ended, and at block 410 the processor may send a hibernate signal to the PMIC to transition the device to a hibernate mode. At block 412, the processor may save or store all processes running or executing on the processor and the registry content of the memory data register in a non-volatile memory on the mobile device. At block 414, the PMIC upon receiving the hibernate signal, may power down the processor and power down itself at block 416 to transition the mobile device into the hibernate mode. By powering down the processor and the PMIC, and providing a low power rail to the hall sensor and the boot control circuit, the device may be able to conserve battery and use less power when compared to the suspend mode where both the processor and PMIC need to remain powered on and the device may consume higher power.

One or more operations of the method 400 may have been described above as being performed by the processor 202 or boot control circuit or device 206. It should be appreciated, however, that any of the operations of method 400 may be performed, at least in part, in a distributed manner by one or more other components. Further, the operations of method 400 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Figure 5:
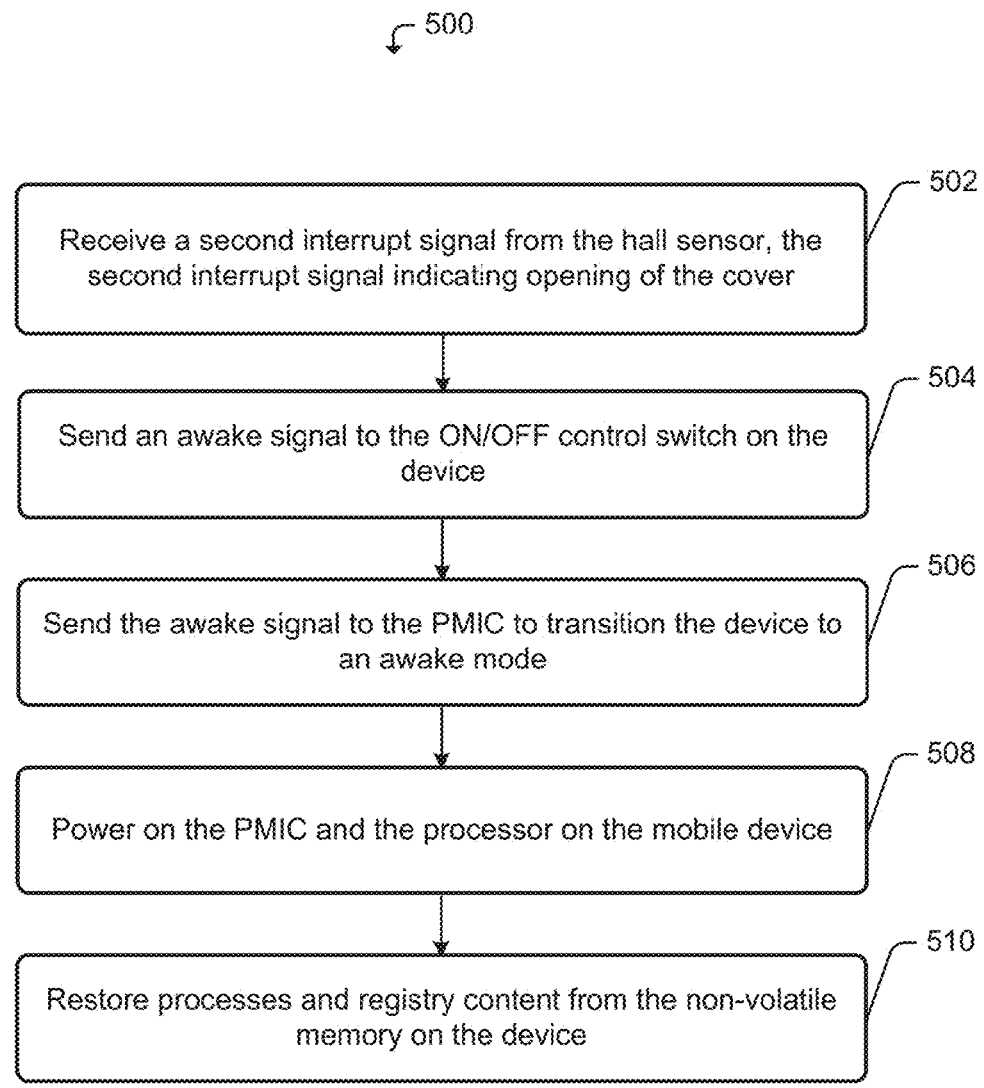
FIG. 5 is a process flow diagram of an illustrative method for transitioning a mobile device to an awake mode from a hibernate mode in accordance with one or more example embodiments of the disclosure.

FIG. 5 is a process flow diagram of an illustrative method for transitioning from a hibernate mode to an awake mode in a mobile device in accordance with one or more example embodiments of the disclosure. Referring to FIG. 5, the battery management module may continue to provide power to the cover sensor or hall sensor and the boot control circuit in the hibernate mode. At block 502, when the cover of the device is opened, the hall sensor sends a logical input or interrupt signal to the boot control circuit. At block 504, the boot control circuit may send an awake signal to the ON/OFF control switch on the device, which signal is then passed on the PMIC to transition the device to an awake mode at block 506. At block 508, the PMIC upon receiving this awake signal, turns on power to the processor and all other components that require to be powered on in an awake mode of the device. At block 510 the processor may restore all saved processes and registry content from the non-volatile memory and bring the device to a normal awake or read mode via a quick boot. The difference between the quick boot of the disclosure and a normal boot being, the processor in the case of a quick boot is able to retrieve all saved processes and registry content from the non-volatile memory on the device. However, in a normal boot, which may take up to or more than 30 seconds, the processor has to initiate all processes from start, including the kernel applications.

One or more operations of the method 500 may have been described above as being performed by the processor 202 or control circuit 206. It should be appreciated, however, that any of the operations of method 500 may be performed, at least in part, in a distributed manner by one or more other components. Further, the operations of method 500 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Figure 6:
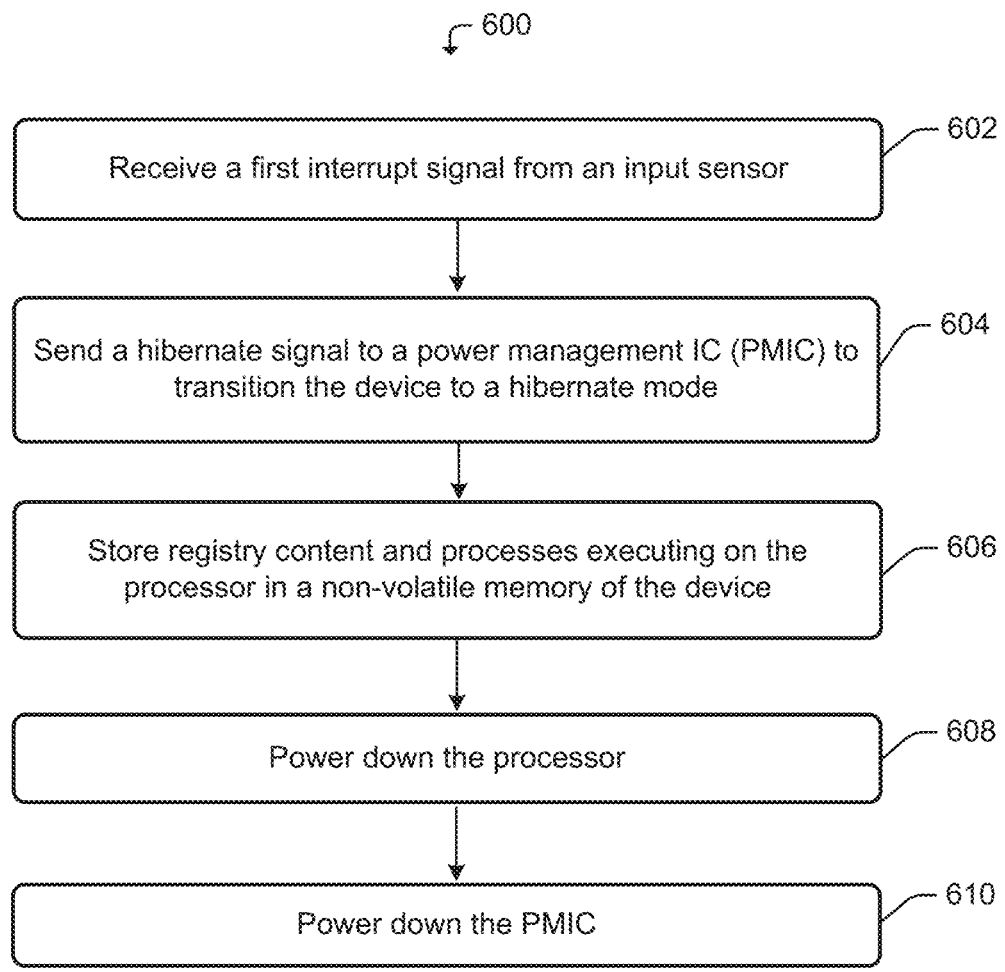
FIG. 6 is a process flow diagram of an illustrative method for transitioning a mobile device into a hibernate mode in accordance with one or more example embodiments of the disclosure.

FIG. 6 is another process flow diagram of an illustrative method for providing a hibernate mode without a suspend mode in a mobile device in accordance with one or more example embodiments of the disclosure. Referring to FIG. 6, at block 602, the processor of the device may receive an input or interrupt signal from an input sensor, which may be the hall sensor described above, or any other input sensor known to one of skill in the art including but not limited to an accelerometer, an optical sensor, an ambient light sensor, a camera device, a capacitive sensor, an audio sensor, or a digital output sensor. At block 604, the processor may send, upon receiving the input from the sensor, a hibernate signal to a power management module to transition the device to a hibernate mode. The power management module may include, for example, the battery management module, the PMIC, and the ON/OFF switch controller described in any of the previous embodiments. At block 606, the processor upon receiving this hibernate signal, may store or save the processes running on the processor and the registry content of the memory data register in a non-volatile memory on the device to enable a quick boot. The difference between the quick boot of the disclosure and a normal boot being, the processor in the case of a quick boot is able to retrieve all saved processes and registry content from the non-volatile memory on the device. However, in a normal boot, which may take up to or more than 30 seconds, the processor has to initiate all processes from start, including the kernel applications. At block 608, the device may transition into an hibernate mode by powering down the processor and PMIC that supplies power to the processor at block 610. It should be noted that in this example embodiment, the device may be capable of transitioning into the hibernate mode directly by not entering a suspend mode. This feature may be enabled either by a user setting on the device or based on a usage pattern of the device or a factory setting as desired.

One or more operations of the method 600 may have been described above as being performed by the processor 202 or control circuit 206. It should be appreciated, however, that any of the operations of method 600 may be performed, at least in part, in a distributed manner by one or more other components. Further, the operations of method 600 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 6 may be performed.

Illustrative Device Architecture

Figure 7:
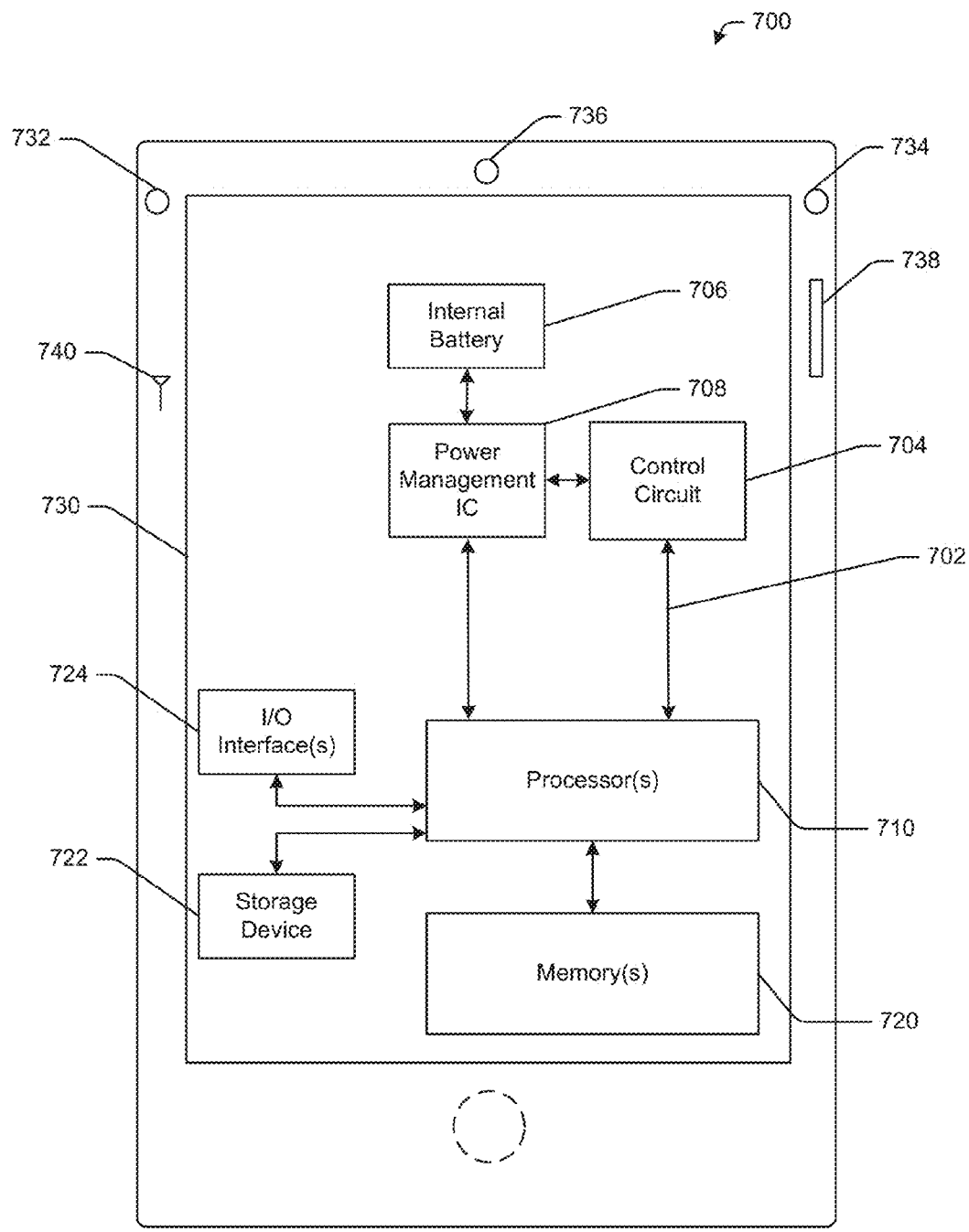
FIG. 7 is a diagram of an illustrative physical implementation of a mobile device in accordance with one or more example embodiments of the disclosure.

FIG. 7 is a schematic diagram illustrating an example user device 700 with a control circuit 704 similar to the low power boot control circuits or devices 206, 306 described in the above example embodiments. In operation, the user device 700 may include computer-readable and computer-executable instructions that reside on the user device 700, as is discussed further below. The user device 700 may include an address/data bus 702 for conveying data among components of the user device 700. Each component within the computing device 700 may also be directly connected to other components in addition to (or instead of) being connected to other components across the bus 702. Device 700 may include an internal battery 706 which may provide power to a power management IC 708. The power management IC 708 may distribute power to various components of the device 700 including one or more processors 710 and the control circuit 704. The internal battery 706 may be similar to battery 214 described in FIG. 2 and the power management IC may be similar to PMIC 210 described in FIG. 2, respectively.

The control circuit 704 may be included within the user device 700, such as a mobile communications device, a personal electronic device, or any portable electronic device. The user device 700 may include, but is not limited to, a personal computer, a desktop computer, a notebook computer, a laptop computer, a personal digital assistant, an electronic book (ebook) reader, a tablet computing device, a pad computing device, a smartphone, wearable devices, or combinations thereof. The user device 700 may include one or more application processor(s) 710 and/or memory(s) 720.

In some example embodiments, the processors 710 of the user device 700 may be implemented as appropriate in hardware, software, firmware, or combinations thereof. Software or firmware implementations of the processors 710 may include computer-executable or machine-executable instructions written in any suitable programming language to perform the various functions described. Hardware implementations of the processors 710 may be configured to execute computer-executable or machine-executable instructions to perform the various functions described. The one or more processors 710 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 700 may also include a chipset (not shown) for controlling communication between the one or more processors 710 and one or more of the other components of the user device 700. The one or more processors 710 may also include one or more application specific integrated circuits (ASICs) or application specific standard products (ASSPs) for handling specific data processing functions or tasks.

The memory/storage 720 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 720 may store program instructions that are loadable and executable on the processor(s) 710, as well as data generated or received during the execution of these programs. The memory 720 may include one or more operating systems (O/S) and one or more application software that may be executed by the processors 710 to control the user device 700 and the control circuit 704. The memory 720 may also provide temporary "working" storage at runtime for any applications being executed on the processors(s) 710. The computer instructions may be stored in a non-transitory manner in non-volatile memory 720, storage 722, or an external device. Alternatively, some or all of the executable instructions may be embedded in hardware or firmware in addition to or instead of software.

The user device 700 may include input/output device interfaces 724. A variety of components may be connected through the input/output device interfaces 724, such as a display or display screen 730 having a touch surface or touchscreen, an audio output device for producing sound, such as speaker(s) 732, one or more audio capture device(s), such as a microphone or an array of microphones 734, one or more image and/or video capture devices, one or more haptic units 738, and other components. The display 730, speaker(s) 732, microphone(s) 734, haptic unit(s) 738, and other components may be integrated into the user device 700 or may be separate.

The display 730 may be a video output device for displaying images. The display 730 may be a display of any suitable technology, such as a liquid crystal display, an organic light emitting diode display, electronic paper, an electrochromic display, a cathode ray tube display, a pico projector or other suitable component(s). The display 730 may also be implemented as a touchscreen and may include components such as electrodes and/or antennae for use in detecting stylus input events or detecting when a stylus is hovering above, but not touching, the display 730.

The input/output device interfaces 724 may also include an interface for an external peripheral device connection such as universal serial bus (USB), FireWire, Thunderbolt, Ethernet port or other connection protocol that may connect to one or more networks. The input/output device interfaces 724 may also include a connection to one or more antennas 740 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 700 may be any suitable electronic device such as, for example, a desktop or laptop PC, a smartphone, a digital personal assistant, a tablet, a wearable computing device, or the like. In certain example embodiments, the device 700 may include one or more antennas 740 including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The battery may be any suitable type of battery including, but not limited to, any Li-ion or Li-based battery. Packaging material for the battery may include, without limitation, various tri-laminated combinations of aluminum, graphene, nylon and PET or other hermetic and sealable packaging materials or combinations thereof.

Referring now to other components of the device 700, the bus(es) may include at least one of a system bus, a memory bus, an address bus, or a message bus, and may permit exchange of information (e.g., data (including computer-executable code), signaling, etc.) between various components of the device 700. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCM-CIA) architecture, a Universal Serial Bus (USB) architecture, and so forth.

The memory(s) 720 of the device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 720 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage device 722 may include removable storage and/or non-removable storage including, but not limited to, magnetic storage, optical disk storage, solid-state storage, and/or tape storage. The data storage 722 may provide non-volatile storage of computer-executable instructions and other data. The memory 720 and the data storage 722, removable and/or non-removable, are examples of computer-readable storage media (CRSM) as that term is used herein.

The data storage 722 may store computer-executable code, instructions, or the like that may be loadable into the memory 720 and executable by the processor(s) 710 to cause the processor(s) 710 to perform or initiate various operations. The data storage 722 may additionally store data that may be copied to memory 720 for use by the processor(s) 710 during the execution of the computer-executable instructions. Moreover, output data generated as a result of execution of the computer-executable instructions by the processor(s) 710 may be stored initially in memory 720, and may ultimately be copied to data storage 722 for non-volatile storage.

More specifically, the data storage 722 may store one or more operating systems (O/S) and one or more applications, program modules, or the like. Any applications stored in the data storage 722 may be loaded into the memory 720 for execution by the processor(s) 710. Further, any data (not shown) stored in the data storage may be loaded in to the memory 720 for use by the processor(s) 710 in executing computer-executable code.

The processor(s) 710 may include any suitable processing unit capable of accepting data as input, processing the input data in accordance with stored computer-executable instructions, and generating output data. The processor(s) 710 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 710 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 710 may be capable of supporting any of a variety of instruction sets.

Referring now to other illustrative components depicted as being stored in the data storage 722, the O/S may be loaded from the data storage 722 into the memory 710 and may provide an interface between application(s) executing on the device 700 and hardware resources of the device 700. More specifically, the O/S may include a set of computer-executable instructions for managing hardware resources of the device 700 and for providing common services to application programs (e.g., managing memory allocation among various application programs). The O/S may include any operating system now known or which may be developed in the future including, but not limited to, any server operating system, any mainframe operating system, or any other proprietary or non-proprietary operating system.

The input/output (I/O) interface(s) 724 may facilitate the receipt of input information by the device 700 from one or more I/O devices as well as the output of information from the device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 700 or may be separate. The I/O devices may further include, for example, any number of peripheral devices such as data storage devices, printing devices, and so forth.

The I/O interface(s) 724 may also include an interface for an external peripheral device connection such as universal serial bus (USB), FireWire, Thunderbolt, Ethernet port or other connection protocol that may connect to one or more networks. The I/O interface(s) 724 may also include a connection to one or more of the antenna(s) 740 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 700 may further include one or more network interfaces via which the device 700 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s)/sensor interface(s) 732, 734, 736, may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

The antenna(s) 740 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

As previously described, the antenna(s) 740 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 740 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 7 GHz channels (e.g. 802.11n, 802.11ac), or 60 GHZ channels (e.g. 802.11ad). In alternative example embodiments, the antenna(s) 740 may be configured to transmit or receive radio frequency signals within any suitable frequency range forming part of the unlicensed portion of the radio spectrum.

The antenna(s) 740 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) may include any suitable radio component(s) for—in cooperation with the antenna(s) 740—transmitting or receiving radio frequency (RF) signals in the bandwidth and/or channels corresponding to the communications protocols utilized by the device 700 to communicate with other devices. The transceiver(s) may include hardware, software, and/or firmware for modulating, transmitting, or receiving—potentially in cooperation with any of antenna(s) 740—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) may further include hardware, firmware, or software for receiving GNSS signals. The transceiver(s) may include any known receiver and baseband suitable for communicating via the communications protocols utilized by the device 700. The transceiver(s) may further include a low noise amplifier (LNA), additional signal amplifiers, an analog-to-digital (A/D) converter, one or more buffers, a digital baseband, or the like.

It should be appreciated that the device 700 may include alternate and/or additional hardware, software, or firmware components beyond those described or depicted without departing from the scope of the disclosure. More particularly, it should be appreciated that software, firmware, or hardware components depicted as forming part of the device 700 are merely illustrative and that some components may not be present or additional components may be provided in various embodiments.

Various other changes and modifications to the embodiments herein chosen for purposes of illustration will readily occur to those skilled in the art. For example, certain materials for the purposes of bonding and/or castellated contact formation were described, but other materials may also be effective. Further additional intervening layers may be able to be provided while still benefiting from the explained embodiments. Examples were described to aid in understanding. Thus, it was not intended that these examples were the only examples. To the extent that such modifications and variations do not depart from the spirit of the invention, they are intended to be included within the scope thereof. It will be readily understood to those skilled in the art that various other changes in the details, material, and arrangements of the parts and method stages which have been described and illustrated in order to explain the nature of this disclosure may be made without departing from the principles and scope of the disclosure.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electronic reader device, comprising:
a cover having a magnetic portion;
a hall sensor that detects the magnetic portion of the cover when the cover is closed;
a boot control circuit that is configured to transition the electronic reader device from the hibernate mode to the awake mode upon an indication that the cover is opened;
a power management integrated circuit (PMIC) that manages power distribution to components of the electronic reader device in different modes of operation;
at least one memory storing computer-executable instructions; and
a processor configured to access the at least one memory and execute the computer-executable instructions to:
receive a first interrupt signal from the hall sensor, the first interrupt signal indicating the cover is closed;
send a first signal to the PMIC to place the electronic reader device in a suspend mode, wherein in the suspend mode, the processor and the PMIC operate at a reduced power level as compared to an awake mode of the electronic reader device;
send a second signal to the PMIC to place the electronic reader device in a hibernate mode;
store, in a non-volatile memory of the electronic reader device, registry content of a memory data register and processes executing on the processor;
power off the processor and the PMIC;
send, in the awake mode and suspend mode of the electronic reader device, a third signal to the boot control circuit; and
disable, based at least in part on the third signal, the boot control circuit from initiating the transition from the hibernate mode to the awake mode.

2. The electronic reader device of claim 1, wherein the boot control circuit is further configured to:

receive a second interrupt signal from the hall sensor indicating that the cover is opened; and initiate the transition of the electronic reader device from the hibernate mode to the awake mode, wherein the transition to the awake mode includes,
powering on the processor and PMIC, and
restoring the processes and registry content of the memory data register.

3. A method, comprising:
providing power to an input sensor and a boot control circuit of a mobile device operating in a first power mode, wherein in the first power mode a processor and power management integrated circuit (PMIC) of the mobile device are powered off;
detecting, by the input sensor, occurrence of a first event;
receiving, by the boot control circuit, a first interrupt signal from the input sensor, the first interrupt signal corresponding to the first event;
sending, by the boot control circuit, a first signal to a control switch;
placing, based at least in part on the first signal, the mobile device in a second power mode, wherein the placing in the second power mode includes,
powering on the PMIC;
powering on the processor of the mobile device;
restoring, by the processor, processes and registry content stored in a non-volatile memory of the mobile device;
disabling, while the mobile device is in the second power mode or a suspend mode, the boot control circuit from initiating a transition from the first power mode to the second power mode;
receiving, by the processor, a second interrupt signal from the input sensor, the second interrupt signal indicating occurrence of a second event;
sending, by the processor, a suspend signal to the PMIC to place the mobile device in the suspend mode;
initiating, by the processor, a timer at a first value and
powering off the PMIC.

4. The method of claim 3, further comprising:
storing, by the processor, registry content of a memory data register and a process executing on the processor in the non-volatile memory of the mobile device; and
powering off the processor.

5. The method of claim 3, further comprising:
tracking daily usage of the mobile device to generate a usage pattern; and
determining the first value using the usage pattern.

6. The method of claim 3, further comprising:
sending, by the processor, a disable signal to the boot control circuit indicating the processor is powered on.

7. The method of claim 3, further comprising:
receiving, by the processor, an input at a first time based on a real-time clock of the mobile device;
sending, by the processor, a second signal to the PMIC; and
placing, based on the second signal, the mobile device in the first power mode at the first time, wherein the placing comprises:
storing, by the processor, registry content of a memory data register and a process executing on the processor in the non-volatile memory of the mobile device;
powering off the processor; and
powering off the PMIC.

8. The method of claim 3, wherein the boot control circuit comprises a monostable multivibrator circuit.

9. The method of claim 3, wherein the input sensor is one of a hall sensor, an accelerometer, an optical sensor, an ambient light sensor, a camera device, a capacitive sensor, an audio sensor, or a digital output sensor.

10. A device, comprising:
an input sensor configured to detect an input to transition the device from a first power mode to a second power mode;
a power management integrated circuit (PMIC) configured to manage power distribution within the device;
at least one memory storing computer-executable instructions;
a processor operatively coupled to the PMIC and configured to access the at least one memory and execute the computer-executable instructions; and
a boot control circuit operatively coupled to the input sensor, the PMIC, and the processor, the boot control circuit configured to:
receive a first interrupt signal from the input sensor, the first interrupt signal indicating a first input;
transition, based on the first input, the device from the first power mode to the second power mode, the first power mode including the processor and the PMIC being powered off;
send a first signal to a control switch;
transition, based on the first signal, the device to the second power mode, wherein transitioning to the second power mode comprises:
powering on the PMIC;
powering on the processor; and
restoring, by the processor, one or more processes and registry content stored in a non-volatile memory of the device;
disable, while the device is in the second power mode or a suspend mode, the boot control circuit from initiating a transition from the first power mode to the second Power mode;
receive a second interrupt signal from the input sensor, the second interrupt signal indicating a second input;
place, based on the second input, the device in the first power mode;
send a suspend signal to the PMIC;
place, based on the sending of the suspend signal, the device in the suspend mode;
initiate, upon placing the device in the suspend mode, a timer at a first value;
determine that the timer has expired; and
power off the PMIC.

11. The device of claim 10, wherein the processor is further configured to execute the computer-executable instructions to:
send a second signal to the PMIC to place the device in the first power mode, wherein the placing in the first power mode comprises:
storing, by the processor, registry content of a memory data register and a process executing on the processor in the non-volatile memory of the device; and
powering off the processor.

12. The device of claim 11, wherein the first input is opening of a cover of the device, and the second input is closing of the cover of the device.

13. The device of claim 10, wherein the processor is further configured to execute the computer-executable instructions to:
track daily usage of the device to generate a usage pattern; and
determine the first value using the usage pattern.

14. The device of claim 10, wherein the processor is further configured to execute the computer-executable instructions to:
   send a disable signal to the boot control circuit indicating the processor is powered on.

15. The device of claim 10, wherein the processor is further configured to execute the computer-executable instructions to:
   receive a third input at a first time based on a real-time clock of the device; and
   send a second signal to the PMIC based on the third input;
   place, based on the second signal, the device in the first power mode at the first time, wherein the placing in the first power mode comprises:
   storing, by the processor, registry content of a memory data register and a process executing on the processor in the non-volatile memory of the device; and
   powering off the processor.

16. The device of claim 10, wherein the boot control circuit comprises a monostable multivibrator circuit.

17. The device of claim 10, wherein the input sensor is one of: a hall sensor, an accelerometer, an optical sensor, an ambient light sensor, a camera device, a capacitive sensor, an audio sensor, or a digital output sensor.

\* \* \* \* \*